(12) United States Patent
Shibamori et al.

(10) Patent No.: US 8,595,144 B2
(45) Date of Patent: Nov. 26, 2013

(54) MANAGEMENT SYSTEM AND METHOD FOR EXHAUST PURIFICATION APPARATUS

(75) Inventors: Kazuhiro Shibamori, Joso (JP);
Hidenobu Tsukada, Ushiku (JP);
Kazunori Nakamura, Tsuchiura (JP);
Yoichi Kowatari, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 395 days.

(21) Appl. No.: 12/823,458

(22) Filed: Jun. 25, 2010

(65) Prior Publication Data

US 2011/0004559 A1    Jan. 6, 2011

(30) Foreign Application Priority Data

Jul. 3, 2009    (JP) ................................. 2009-158537

(51) Int. Cl.
*G06Q 10/00*    (2012.01)
(52) U.S. Cl.
USPC .......................................... 705/307; 705/400
(58) Field of Classification Search
USPC .................................. 705/307, 400
See application file for complete search history.

(56) References Cited

U.S. PATENT DOCUMENTS

| 6,292,724 | B1 * | 9/2001 | Apsell et al. .................. 701/29.3 |
| 6,449,884 | B1 * | 9/2002 | Watanabe et al. ............... 37/348 |
| 2002/0052813 | A1 * | 5/2002 | Kinugawa et al. .............. 705/34 |
| 2003/0110667 | A1 * | 6/2003 | Adachi et al. ................... 37/348 |
| 2008/0127637 | A1 * | 6/2008 | Henderson ....................... 60/295 |

FOREIGN PATENT DOCUMENTS

| EP | 1 172 717 A2 | 1/2002 |
| EP | 1 318 469 A1 | 6/2003 |
| JP | 2003-155914 A | 5/2003 |

* cited by examiner

*Primary Examiner* — Denis Ruhl
(74) *Attorney, Agent, or Firm* — Mattingly & Malur, PC (57) ABSTRACT

In a server 10, a standard setting section 11 establishes a standard amount of deposits and a standard amount of money of a maintenance charge in advance; a first calculating section 12 calculates the maintenance charge by multiplying the standard amount of money by a ratio of a deposition level at returning to a standard deposition level; a memory section 13 stores in memory an engine operating time, the number of regeneration sequences performed, and a reduction coefficient table; a second calculating section 14 establishes a reduction coefficient based on the reduction coefficient table and reduces the maintenance charge after reduction by multiplying the maintenance charge calculated by the first calculating section 12 by the reduction coefficient; and a third calculating section 15 calculates an amount of refund by subtracting the value of the maintenance charge from the value of a maintenance guarantee.

5 Claims, 4 Drawing Sheets

| OPERATING TIME | NUMBER OF REGENERA-TION SEQUENCES | REDUCTION COEFFICIENT |
|---|---|---|
| 0~500 | ~5 | 1.0 |
| | ~10 | 0.8 |
| | ~15 | 0.6 |
| | 16~ | 0.5 |

| OPERATING TIME | NUMBER OF REGENERA-TION SEQUENCES | REDUCTION COEFFICIENT |
|---|---|---|
| 500~1000 | ~10 | 1.0 |
| | ~20 | 0.8 |
| | ~30 | 0.5 |
| | 31~ | 0.4 |

| OPERATING TIME | NUMBER OF REGENERA-TION SEQUENCES | REDUCTION COEFFICIENT |
|---|---|---|
| 1000~1500 | ~15 | 1.0 |
| | ~20 | 0.6 |
| | ~30 | 0.4 |
| | 31~ | 0.2 |

| OPERATING TIME | NUMBER OF REGENERA-TION SEQUENCES | REDUCTION COEFFICIENT |
|---|---|---|
| 1500~2000 | ~20 | 1.0 |
| | ~30 | 0.5 |
| | ~50 | 0.3 |
| | 51~ | 0.2 |

| OPERATING TIME | NUMBER OF REGENERA-TION SEQUENCES | REDUCTION COEFFICIENT |
|---|---|---|
| 2000~ | ~25 | 1.0 |
| | ~40 | 0.5 |
| | ~60 | 0.2 |
| | 61~ | 0.1 |

| OPERATING TIME | NUMBER OF REGENERA-TION SEQUENCES | REDUCTION COEFFICIENT |
|---|---|---|
| 0~500 | ~5 | 1.0 |
| | ~10 | 0.8 |
| | ~15 | 0.6 |
| | 16~ | 0.5 |

| OPERATING TIME | NUMBER OF REGENERA-TION SEQUENCES | REDUCTION COEFFICIENT |
|---|---|---|
| 500~1000 | ~10 | 1.0 |
| | ~20 | 0.8 |
| | ~30 | 0.5 |
| | 31~ | 0.4 |

| OPERATING TIME | NUMBER OF REGENERA-TION SEQUENCES | REDUCTION COEFFICIENT |
|---|---|---|
| 1000~1500 | ~15 | 1.0 |
| | ~20 | 0.6 |
| | ~30 | 0.4 |
| | 31~ | 0.2 |

| OPERATING TIME | NUMBER OF REGENERA-TION SEQUENCES | REDUCTION COEFFICIENT |
|---|---|---|
| 1500~2000 | ~20 | 1.0 |
| | ~30 | 0.5 |
| | ~50 | 0.3 |
| | 51~ | 0.2 |

| OPERATING TIME | NUMBER OF REGENERA-TION SEQUENCES | REDUCTION COEFFICIENT |
|---|---|---|
| 2000~ | ~25 | 1.0 |
| | ~40 | 0.5 |
| | ~60 | 0.2 |
| | 61~ | 0.1 |

CASE (1) FIG.4A

RENTAL MACHINE SERIAL NUMBER
ZX200-3  NO. 1002

RENTAL PERIOD STARTING DATE:
OCTOBER 1, 2008
HOUR METER VALUE: 1000 h
DPF DEPOSITION LEVEL: LV0

RENTAL PERIOD ENDING DATE:
MARCH 28, 2009
HOUR METER VALUE: 1960 h
ENGINE OPERATING TIME: 960 h
DPF DEPOSITION LEVEL: LV2

NUMBER OF AUTOMATIC REGENE
-RATION SEQUENCES: 200 TIMES
NUMBER OF MANUAL REGENE
-RATION SEQUENCES: 25 TIMES

VALUE OF MAINTENANCE
GUARANTEE: ¥300,000
MAINTENANCE CHARGE: ¥60,000
AMOUNT OF REFUND: ¥240,000

CASE (2) FIG.4B

RENTAL MACHINE SERIAL NUMBER
ZX200-3  NO. 1002

RENTAL PERIOD STARTING DATE:
OCTOBER 1, 2008
HOUR METER VALUE: 1000 h
DPF DEPOSITION LEVEL: LV0

RENTAL PERIOD ENDING DATE:
MARCH 28, 2009
HOUR METER VALUE: 1960 h
ENGINE OPERATING TIME: 960 h
DPF DEPOSITION LEVEL: LV3

NUMBER OF AUTOMATIC REGENE
-RATION SEQUENCES: 250 TIMES
NUMBER OF MANUAL REGENE
-RATION SEQUENCES: 35 TIMES

VALUE OF MAINTENANCE
GUARANTEE: ¥300,000
MAINTENANCE CHARGE: ¥72,000
AMOUNT OF REFUND: ¥228,000

CASE (3) FIG.4C

RENTAL MACHINE SERIAL NUMBER
ZX200-3  NO. 1002

RENTAL PERIOD STARTING DATE:
OCTOBER 1, 2008
HOUR METER VALUE: 1000 h
DPF DEPOSITION LEVEL. LV0

RENTAL PERIOD ENDING DATE:
SEPTEMBER 27, 2009
HOUR METER VALUE: 2920 h
ENGINE OPERATING TIME: 1920 h
DPF DEPOSITION LEVEL: LV3

NUMBER OF AUTOMATIC REGENE
-RATION SEQUENCES: 400 TIMES
NUMBER OF MANUAL REGENE
-RATION SEQUENCES: 45 TIMES

VALUE OF MAINTENANCE
GUARANTEE: ¥300,000
MAINTENANCE CHARGE: ¥54,000
AMOUNT OF REFUND: ¥246,000

CASE (4) FIG.4D

RENTAL MACHINE SERIAL NUMBER
ZX200-3  NO. 1002

RENTAL PERIOD STARTING DATE:
OCTOBER 1, 2008
HOUR METER VALUE: 1000 h
DPF DEPOSITION LEVEL: LV0

RENTAL PERIOD ENDING DATE:
MARCH 27, 2009
HOUR METER VALUE: 1960 h
ENGINE OPERATING TIME: 960 h
DPF DEPOSITION LEVEL: LV4

NUMBER OF AUTOMATIC REGENE
-RATION SEQUENCES: 240 TIMES
NUMBER OF MANUAL REGENE
-RATION SEQUENCES: 8 TIMES

VALUE OF MAINTENANCE
GUARANTEE: ¥300,000
MAINTENANCE CHARGE: ¥240,000
AMOUNT OF REFUND: ¥60,000

MANAGEMENT SYSTEM AND METHOD FOR EXHAUST PURIFICATION APPARATUS

BACKGROUND OF THE INVENTION

1. Field of the Invention

The present invention relates to management systems for exhaust purification apparatuses. The invention relates more particularly to a management system for an exhaust purification apparatus that purifies exhaust gases by using a filter to trap particulate matter contained in the exhaust gases and regenerates the filter by burning to remove the particulate matter trapped by the filter as appropriately.

2. Description of Background Art

Construction machines, such as hydraulic excavators, are mounted with diesel engines as their drive sources. Regulations on the amount of particulate matter (hereinafter abbreviated to "PM"), together with NOx, CO, HC, and other substances, emitted from the diesel engines have been increasingly stringent year after year. In response to such a trend in these regulations, a known exhaust purification apparatus incorporates a filter called a diesel particulate filter (hereinafter abbreviated to "DPF") that traps PM to thereby reduce the amount of PM discharged externally. In this exhaust purification apparatus, the filter begins to clog as the amount of PM deposited therein increases. This causes engine exhaust pressure to increase, inviting degraded fuel efficiency. The PM trapped in the filter is then burned as appropriately to thereby remove clogging, so that the filter can be regenerated.

Regeneration of the filter is generally accomplished by using an oxidation catalyst. The oxidation catalyst may be disposed upstream of the filter, carried directly by the filter, or both. In either case, to activate the oxidation catalyst, the exhaust gas must have a temperature that is higher than an activating temperature of the oxidation catalyst. To achieve this end, a technique called active regeneration is known, in which the exhaust gas temperature is forced to increase to a level higher than the activating temperature of the oxidation catalyst. The active regeneration is achieved by several techniques, including one in which an auxiliary injection (post-injection) is performed to inject fuel in an expansion stroke following a cylinder main injection to thereby increase the exhaust gas temperature and one in which a regeneration fuel injection device disposed in an exhaust pipe is used to inject fuel into the exhaust gas that flows through the exhaust pipe, thereby increasing the exhaust gas temperature.

As a condition for starting the active regeneration, the foregoing techniques estimate the amount of PM deposited (the amount of PM trapped) in the filter. The regeneration is performed when the amount of PM deposited in the filter reaches a preset limit value for the amount of PM deposits. In this case, typically, a differential pressure across the filter is detected and the amount of PM deposits is calculated based on the detected differential pressure. The active regeneration of the filter may be automatic, in which case the active regeneration is automatically started, or manual, in which case the active regeneration is started by an operator input.

In the automatic active regeneration, a controller of the exhaust purification apparatus receives an input of a signal indicative of the amount of PM deposits and, when determining that the amount of PM deposits exceeds a threshold value, outputs a command signal for starting the regeneration. The exhaust purification apparatus then automatically starts regeneration. The exhaust purification apparatus automatically stops the regeneration after a predetermined period of time elapses or when determining that the amount of PM deposits is equal to or less than a predetermined value as a result of the burning removal.

There may still be cases in which PM is deposited without being properly burned and removed even through the automatic active regeneration depending on use conditions: for example, in cold areas or under similar conditions, the exhaust gas temperature may not increase to a level higher than the activating temperature; and the engine stops running in the middle of the automatic active regeneration. A technique is proposed that performs manual active regeneration that is started by an operator input in such cases (JP-2003-155914-A). In the manual active regeneration, the controller of the exhaust purification apparatus receives an input of a signal indicative of the amount of PM deposits and, when determining that the amount of PM deposits exceeds a threshold value, outputs an alarm signal prompting the regeneration. Noticing the alarm display, the operator operates a regeneration switch. Receiving the input of an operation signal, the controller of the exhaust purification apparatus outputs a command signal for starting the regeneration.

The current mainstream indicating the operating status of the hydraulic excavators and other construction machines is such that rental businesses purchase a large number of construction machines and rent them to customers who are engaged in civil engineering work as necessary. In this case, an operator as one of the customers operates the regeneration switch to perform the manual active regeneration. The PM trapped in the filter is burned and removed by an appropriate use of the operator. After using the hydraulic excavator, the customer returns the hydraulic excavator to the rental company. The rental company as an administrator services and maintains the hydraulic excavator before renting the same to another customer. If the amount of PM deposited in the filter is small upon returning of the hydraulic excavator, the rental company has only to perform a simple maintenance procedure for the exhaust purification apparatus.

The manual active regeneration may not, however, be performed properly despite the alarm display prompting the manual active regeneration for various reasons. Examples of the reasons include, but not limited to, the operator's inadvertently overlooking the alarm display of the manual active regeneration; the operator's being reluctant to consume extra fuel; and the operator's underestimating the importance of the manual active regeneration. If, as a result, there is a large amount of PM deposited in the filter upon returning of the hydraulic excavator, a service job for removing the PM becomes necessary, which results in an increased load of management in terms of work and time. The foregoing not only incurs maintenance cost, but also leads to reduced earnings as a result of aggravated turnover of rented machines. In the worst case, an amount of PM more than its limit is deposited in the filter, resulting in the exhaust purification apparatus failing or requiring a repair or replacement.

Specifically, if the operator fails to use the exhaust purification apparatus appropriately, increased load results on the part of the administrator in terms of work, time, and expenditure.

SUMMARY OF THE INVENTION

It is an object of the present invention to provide a management system for an exhaust purification apparatus that can reduce load of management on an administrator.

(1) To achieve the foregoing object, according to an aspect of the present invention, there is provided a management system for an exhaust purification apparatus. The exhaust purification apparatus includes a filter, a regenerating device, and operating means. Specifically, the filter is disposed in an engine exhaust system and traps particulate matter contained in exhaust gases. The regenerating device regenerates the filter by burning to remove the particulate matter deposited in the filter. The operating means operates the regenerating device. The exhaust purification apparatus is mounted in a vehicle that is to be rented to a user by an administrator and later returned to the administrator by the user. The system includes amount of deposits acquisition means for acquiring an amount of deposits of the particulate matter deposited in the filter and billing means for billing a maintenance charge according to the amount of deposits at returning acquired by the amount of deposits acquisition means.

By having the billing means that bills the maintenance charge according to the amount of deposits at returning, the administrator can keep on hand expenses to be incurred in performing service and maintenance jobs according to the amount of deposits at returning, if a large amount of PM is deposited in the filter at returning, so that load of management on the administrator in terms of expenditure can be reduced. On the other hand, the user tries to reduce the amount of PM deposits with the aim of reducing the maintenance charge to be billed, which results in a smaller amount of PM deposits at returning. Specifically, load of management on the administrator in terms of work and time can thus be reduced.

(2) In above (1), preferably, the billing means includes: a standard setting section for setting in advance a standard amount of deposits and a standard amount of money of the maintenance charge corresponding to the standard amount of deposits; and a first calculating section for calculating the maintenance charge by multiplying the standard amount of money by a ratio of a value that represents the amount of deposits at returning to a value that represents the standard amount of deposits.

The system can thereby bill the maintenance charge according to the amount of deposits at returning. Specifically, if there is a large amount of PM deposits at returning, the maintenance charge to be billed becomes large; if there is a small amount of PM deposits at returning, the maintenance charge to be billed becomes small.

(3) In (1) above, preferably, the system further includes a memory section for storing an engine operating time for a period of time that begins with renting and ends with returning and the number of regeneration sequences performed by the regenerating device as invoked by the operating means. The billing means includes a second calculating section for reducing the maintenance charge according to the engine operating time and the number of regeneration sequences performed stored in the memory section.

In cold areas or depending on use conditions, PM may be deposited despite an appropriate use of a rental machine by performing the manual regeneration as prompted by the alarm display. It is unreasonable to treat equally a user who uses the rental machine appropriately and one who uses the rental machine inappropriately and charge the same amount to each. Those users who use the rental machine appropriately are favorably treated by reducing the maintenance charge according to the number of regeneration sequences performed. This encourages the user to use the rental machine appropriately and there is accordingly a small amount of PM deposits at returning. Load of management on the administrator can thereby be reduced.

PM may be inevitably deposited if the engine is run for a long time even if the rental machine is used appropriately. It is unreasonable to treat equally a user who uses the rental machine appropriately and one who uses the rental machine inappropriately and charge the same amount to each. Those users who use the rental machine appropriately are favorably treated by reducing the maintenance charge according to the engine operating time. This encourages the user to use the rental machine appropriately and there is accordingly a small amount of PM deposits at returning. Load of management on the administrator can thereby be reduced.

(4) In (2) above, preferably, the standard amount of deposits is a limit amount that results in a damaged exhaust purification apparatus when an amount of the particulate matter that exceeds the standard amount of deposits is deposited in the filter.

This eliminates a possibility that PM is deposited more than the limit amount, so that the exhaust purification apparatus can be prevented from being damaged. The worst case that requires repairs of the exhaust purification apparatus can therefore be avoided and load of management on the administrator in terms of work can be reduced, the administrator having only to remove the PM deposits.

(5) In (2) above, preferably, the standard amount of deposits is a permissible upper limit amount that is less than the limit amount that results in a damaged exhaust purification apparatus.

This eliminates a possibility that PM is deposited more than the permissible upper limit amount, so that the exhaust purification apparatus can be prevented from being damaged even more reliably. The worst case that requires repairs of the exhaust purification apparatus can therefore be avoided and load of management on the administrator in terms of work can be reduced, the administrator having only to remove the PM deposits.

(6) In (2) above, preferably, the standard amount of money is a value of a maintenance guarantee received from the user upon renting and the billing means includes a third calculating section for calculating an amount of refund by subtracting a value of the maintenance charge from the value of the maintenance guarantee.

As such, the administrator's receiving the maintenance guarantee from the user upon renting allows the administrator to keep on hand expenses to be incurred in performing service and maintenance jobs, so that load of management on the administrator in terms of expenditure can be reduced. Similarly, the user's receiving the amount of refund calculated by subtracting the value of the maintenance charge subtracted from the value of the maintenance guarantee helps make the user aware of the importance of the manual regeneration, so that the user makes more efforts to use the rental machine even more appropriately. As a result, load of management in terms of work and time can be reduced.

(7) To achieve the foregoing object, according to an aspect of the present invention, there is provided a method for managing an exhaust purification apparatus. The exhaust purification apparatus includes a filter, a regenerating device, and operating means. Specifically, the filter is disposed in an engine exhaust system and traps particulate matter contained in exhaust gases. The regenerating device regenerates the filter by burning to remove the particulate matter deposited in the filter. The operating means operates the regenerating device. The exhaust purification apparatus is mounted in a vehicle that is to be rented to a user by an administrator and later returned to the administrator by the user. The method includes the steps of acquiring an amount of deposits of the particulate matter deposited in the filter upon returning of the vehicle and billing a maintenance charge according to the amount of deposits at returning acquired in the step of acquiring the amount of deposits.

In accordance with the aspect of the present invention, the administrator can keep on hand expenses to be incurred in performing service and maintenance jobs according to the amount of deposits at returning. On the other hand, the user tries to ensure the appropriate use with the aim of reducing the maintenance charge to be billed, which results in a smaller amount of PM deposits at returning. Load of management on the administrator can thereby be reduced.

Additionally, the exhaust purification apparatus can be prevented from being damaged even more reliably.

BRIEF DESCRIPTION OF THE DRAWINGS

The present invention will be described hereinafter with reference to the accompanying drawings.

DETAILED DESCRIPTION OF THE PREFERRED EMBODIMENTS

A specific embodiment to which the present invention is applied will be described below with reference to the accompanying drawings.

—Configuration—

Figure 1:
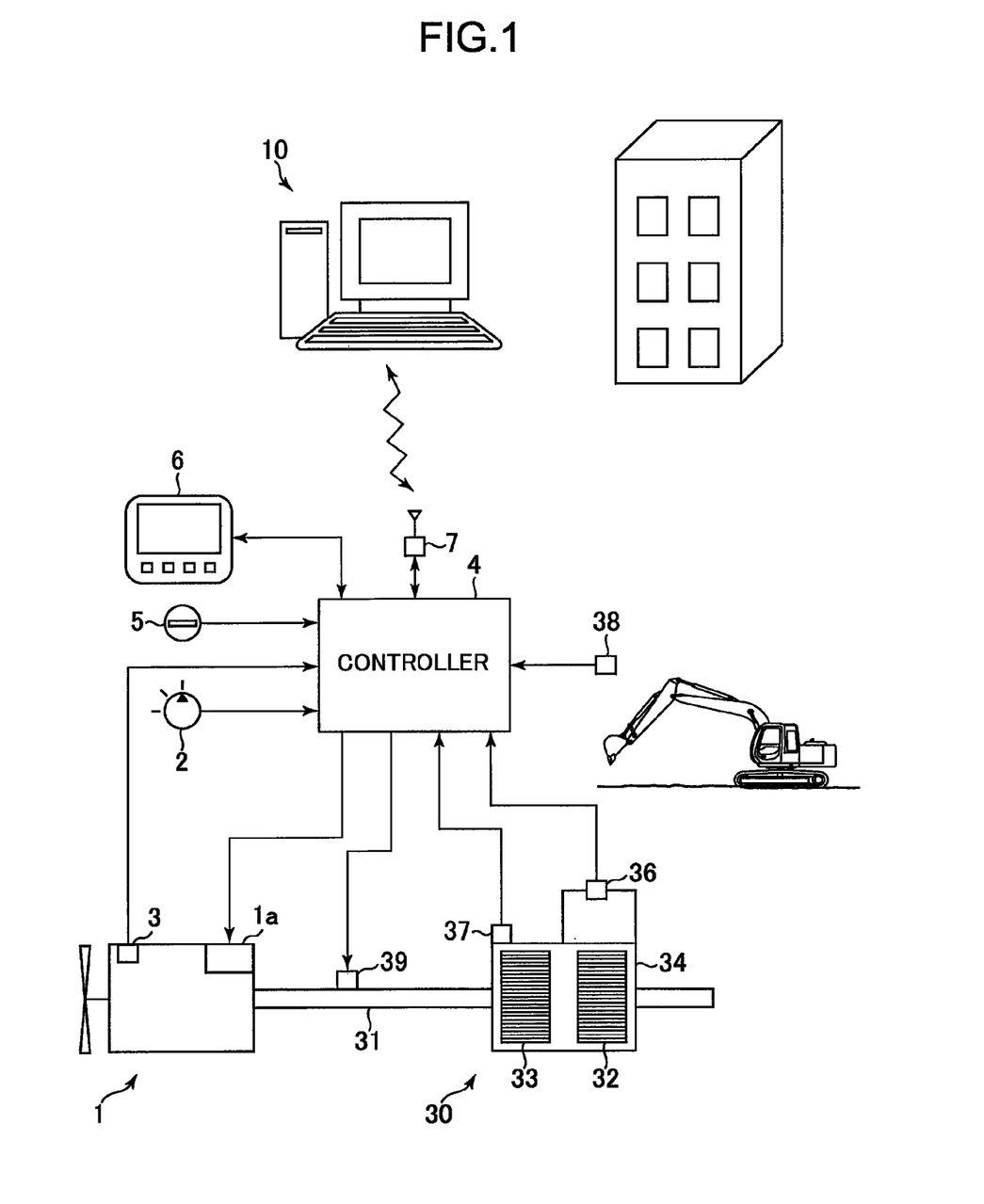
FIG. 1 is a diagram showing a general configuration of a management system for an exhaust purification apparatus according to an embodiment of the present invention.

FIG. 1 is a diagram showing a general configuration of a management system for an exhaust purification apparatus according to an embodiment of the present invention.

The management system for the exhaust purification apparatus manages an exhaust purification apparatus 30. The exhaust purification apparatus 30 is mounted on a construction machine (e.g. a hydraulic excavator). The hydraulic excavator is mounted with a diesel engine 1. The diesel engine 1 includes an electronic governor 1a that is an electronically operated fuel injection control device. A target speed of the diesel engine 1 is commanded by an engine control dial 2, while an actual speed of the diesel engine 1 is detected by a speed detector 3. A command signal from the engine control dial 2 and a detection signal by the speed detector 3 are applied to a controller 4. The controller 4 controls the electronic governor 1a based on the command signal (indicating the target speed) and the detection signal (indicating the actual speed) to thereby control speed and torque of the diesel engine 1. The management system further includes a key switch 5 that serves as a start and stop command device for the diesel engine 1. A command signal from the key switch 5 is also applied to the controller 4. The controller 4 controls the diesel engine 1 for start and stop based on an ON/OFF signal of the command signal from the key switch 5.

The exhaust purification apparatus 30 is disposed on an exhaust pipe 31 that forms part of an exhaust system of the diesel engine 1. The exhaust purification apparatus 30 includes a DPF device 34, a differential pressure detector 36, an exhaust temperature detector 37, a regeneration switch 38, and a regeneration fuel injection device 39. Specifically, the DPF device 34 includes a filter 32 that traps particulate matter contained in exhaust gases and an oxidation catalyst 33 disposed upstream of the filter 32. The differential pressure detector 36 detects a differential pressure across the filter 32 (a pressure loss of the filter 32). The exhaust temperature detector 37 is disposed upstream of the filter 32 and detects a temperature of the exhaust gases. The regeneration fuel injection device 39 is disposed on the exhaust pipe 31 between the diesel engine 1 and the DPF device 34.

The controller 4 receives inputs of detection signals from the differential pressure detector 36 and the exhaust temperature detector 37. Based on these input signals and those from the speed detector 3 and the key switch 5, the controller 4 performs calculation for filter regeneration and, according to a result of the calculation, controls the electronic governor 1a and the regeneration fuel injection device 39. Further, the controller 4 transmits to a display 6 display signals that represent information indicated by the various types of signals from the speed detector 3, the key switch 5, the differential pressure detector 36, and the exhaust temperature detector 37 and result information of the filter regeneration calculation performed by the controller 4. These pieces of information are thereby displayed on a display screen of the display 6. The display 6 is disposed in a cab of the hydraulic excavator.

Filter regeneration will here be described. The filter regeneration may be automatic, in which case the filter regeneration is automatically started, or manual, in which case the filter regeneration is started by an operator input. As the amount of PM deposited in the filter 32 increases, the differential pressure across the filter 32 builds up. The controller 4 estimates the amount of PM deposited in the filter 32 from the differential pressure across the filter 32 detected by the differential pressure detector 36. In automatic regeneration, determining that the amount of PM deposits exceeds a first threshold value, the controller 4 outputs a command signal for starting the regeneration to the regeneration fuel injection device 39.

The regeneration fuel injection device 39 performs fuel injection intended for increasing the exhaust gas temperature (preliminary injection). Determining that the exhaust gas temperature detected by the exhaust temperature detector 37 has increased to a predetermined level, the regeneration fuel injection device 39 performs fuel injection intended for PM combustion (main injection). The fuel injection intended for increasing the exhaust gas temperature is an injection for active regeneration, involving fuel injection made into the exhaust pipe 31 and using an exhaust gas heat that flows though the exhaust pipe 31 to thereby burn fuel, so that the exhaust gas temperature can be increased to a level higher than an activating temperature of the oxidation catalyst 33. The fuel injection intended for PM combustion involves fuel injection made into the exhaust pipe 31 to thereby supply the oxidation catalyst 33 with unburned fuel inside the exhaust pipe 31, so that the unburned fuel is oxidized by the oxidation catalyst 33. A reaction heat obtained during the oxidization is fed into the filter 32, thereby burning to remove PM deposited in the filter 32.

PM may, however, be left deposited without being properly burned to be removed even by the automatic regeneration depending on use conditions. In such cases, the manual regeneration is performed that is started by the operator input. In the manual regeneration, determining that the amount of PM deposits exceeds a second threshold value, the controller 4 outputs an alarm signal that prompts the regeneration to the display 6. Noticing the alarm display displayed on the display 6, the operator operates the regeneration switch 38. The controller 4 receives the input of an operation signal and outputs a command signal for starting the regeneration to the regeneration fuel injection device 39. The second threshold value is set to be higher than the first threshold value to ensure that the automatic regeneration takes precedence over the manual regeneration.

The hydraulic excavator is mounted with a radio communication device 7. Information saved in the controller 4, such as engine operating time, the number of regeneration sequences performed by manual regeneration, and the amount of PM deposits is transmitted wirelessly via the radio communication device 7 to a server 10 of a rental company as an administrator. Instructing information from the server 10 is transmitted to the controller 4 via the radio communication device 7.

Figure 2:
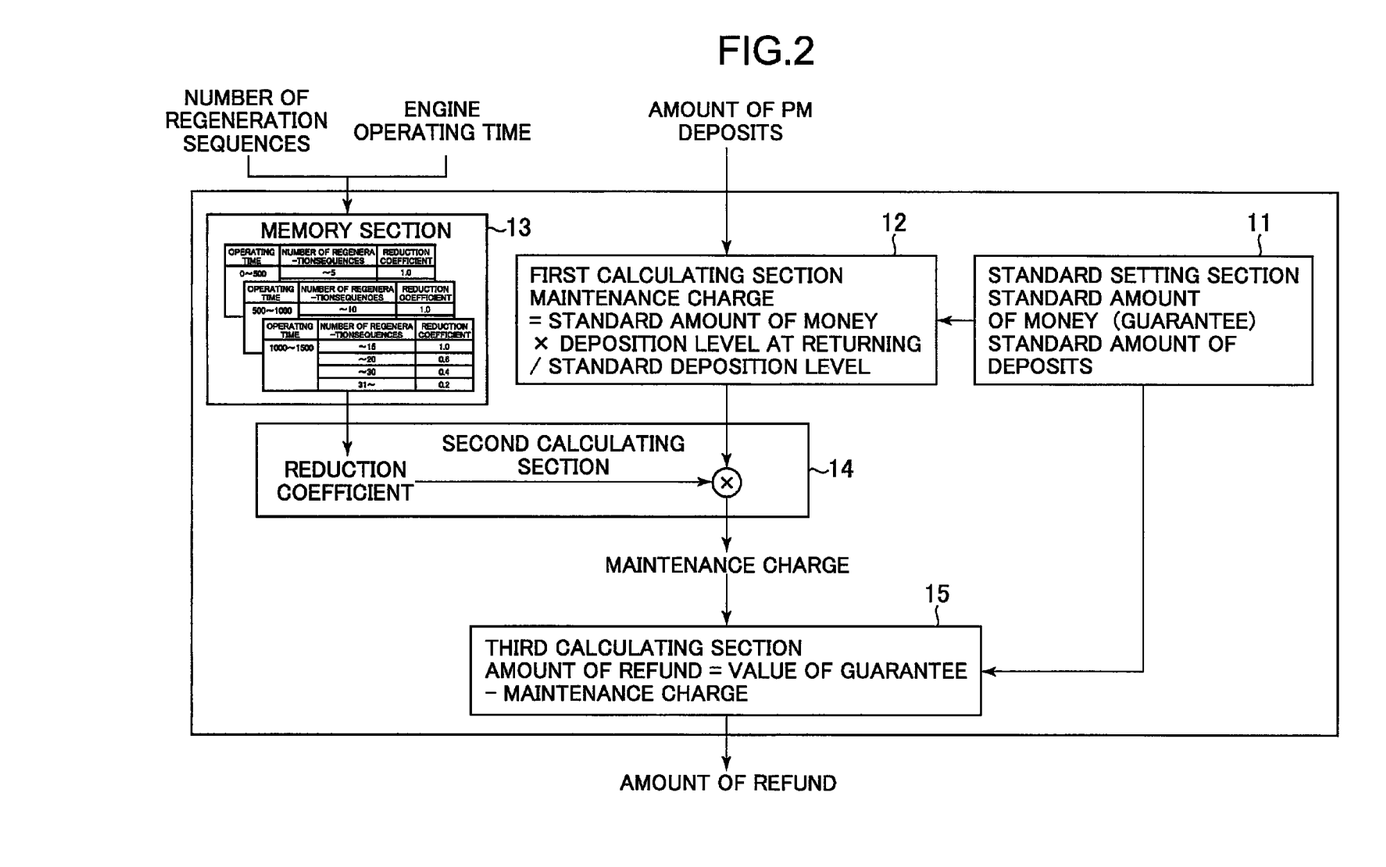
FIG. 2 is a functional block diagram showing a billing unit of the management system for the exhaust purification apparatus.

FIG. 2 is a functional block diagram showing a billing unit of the management system for the exhaust purification apparatus according to the embodiment of the present invention.

The server 10 includes, to perform processing functions thereof, a standard setting section 11, a first calculating section 12, a memory section 13, a second calculating section 14, and a third calculating section 15.

The standard setting section 11 establishes a standard amount of deposits and a standard amount of money of maintenance charge corresponding to the standard amount of deposits.

When an amount of PM exceeding a predetermined amount of deposits is deposited in the filter, a damaged exhaust purification apparatus results. The amount of PM deposits at this time is referred to as a limit amount and a permissible upper limit amount less than the limit amount (e.g. 80 to 90% of the limit amount) is defined as the standard amount of deposits. In accordance with the embodiment of the present invention, the limit amount is 3.0 g/L and the permissible upper limit amount is 2.5 g/L. When the amount of PM deposits exceeds the standard amount of deposits, the diesel engine 1 is brought to a stop to prevent the exhaust purification apparatus 30 from being damaged. The limit amount may still be set as the standard amount of deposits as necessary.

The standard amount of money is an estimated amount of money of the maintenance charge corresponding to the standard amount of deposits. A damaged exhaust purification apparatus needs a repair and the standard amount of money for the repair is determined based on an expected average repair charge. The standard amount of money also corresponds to the value of a maintenance guarantee to be described later. In the embodiment of the present invention, the standard amount of money is ¥300,000.

The first calculating section 12 calculates the maintenance charge by multiplying the standard amount of money by a ratio of a deposition level at returning to a standard deposition level. The standard deposition level represents a value corresponding to the standard amount of deposits. Assume, for example, that the deposition level is divided into six according to the amount of deposits. Then, the standard deposition level is level 5. Information of the amount of PM deposits is inputted from the controller 4 to the server 10 of an administrator company via the radio communication device 7. The acquired data of amount of PM deposits is classified into any of levels 0 to 5. Specifically, level 0 encompasses a range from 0.0 to 0.1 g/L; level 1 encompasses a range from 0.1 to 0.5 g/L; level 2 encompasses a range from 0.5 to 1.0 g/L; level 3 encompasses a range from 1.0 to 1.5 g/L; level 4 encompasses a range from 1.5 to 2.0 g/L; and level 5 encompasses a range from 2.0 to 2.5 g/L.

The memory section 13 stores in memory the following types of data: specifically, an engine operating time for the period from renting to returning of the hydraulic excavator; the number of regeneration sequences performed by the regeneration fuel injection device 39 as invoked by the regeneration switch 38; and a reduction coefficient table that establishes reduction coefficients according to the engine operating time and the number of regeneration sequences. The engine operating time and the number of regeneration sequences are inputted from the controller 4 to the server 10 of the administrator company via the radio communication device 7. The amount of PM deposits is directly inputted to the first calculating section 12 as described earlier; however, the amount of PM deposits may, instead, be inputted to the first calculating section 12 via the memory section 13.

The second calculating section 14 reduces the maintenance charge according to the engine operating time and the number of regeneration sequences stored in the memory section 13. The second calculating section 14 sets a reduction coefficient according to the engine operating time and the number of regeneration sequences based on the reduction coefficient table and multiplies the maintenance charge calculated by the first calculating section 12 by the reduction coefficient.

Figure 3:
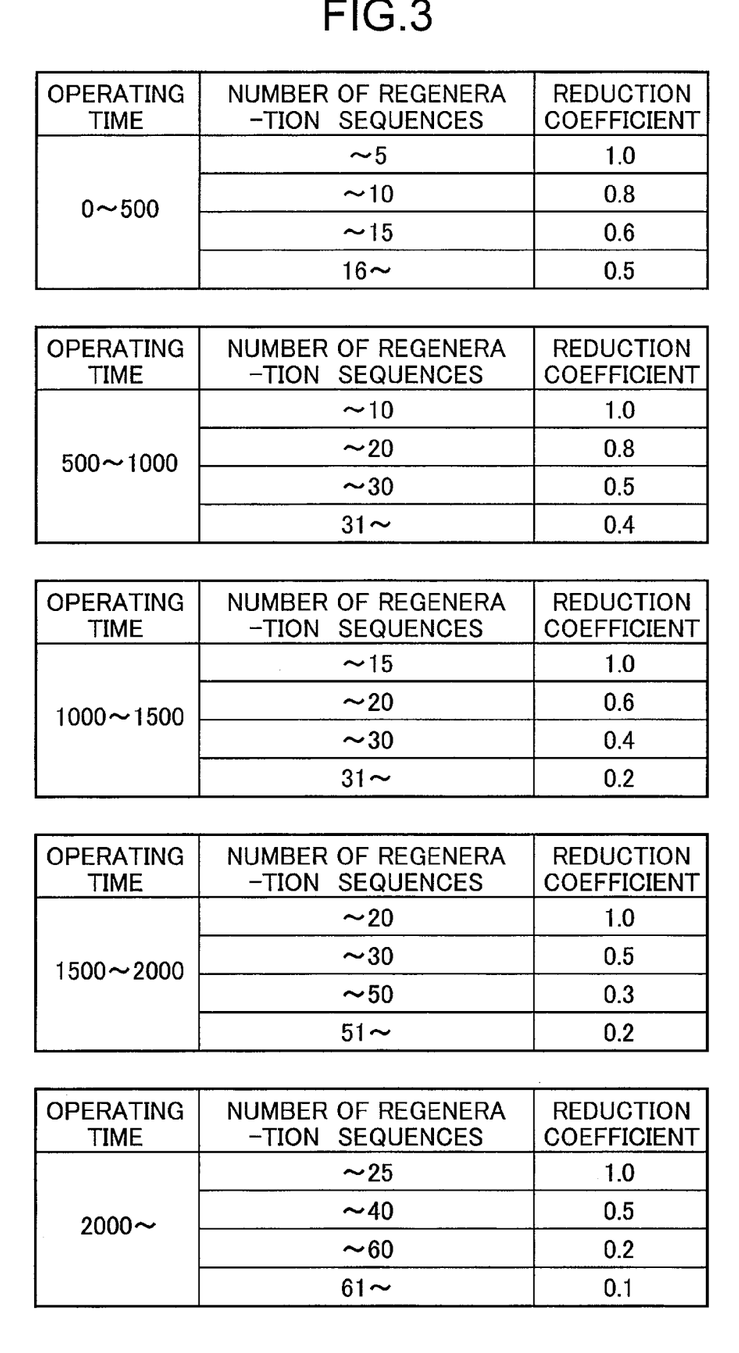
FIG. 3 is a table showing typical reduction coefficients.

FIG. 3 is a table showing typical reduction coefficients. Five tables are created according to the engine operating time, each specifying the reduction coefficients according to the number of regeneration sequences. The smaller the reduction coefficient, the more the maintenance charge is reduced.

In cold areas or depending on the use conditions, PM may be deposited despite an appropriate use of the hydraulic excavator by performing the manual regeneration as prompted by the alarm display. It is unreasonable to treat equally a user who uses the hydraulic excavator appropriately and one who uses the hydraulic excavator inappropriately and charge the same amount to each. The reduction coefficients are set so as to treat favorably those users who use the hydraulic excavator appropriately by reducing the maintenance charge according to the number of regeneration sequences.

On the other hand, PM may be inevitably deposited if the engine is run for a long time even if the hydraulic excavator is used appropriately. It is unreasonable to treat equally a user who uses the hydraulic excavator appropriately and one who uses the hydraulic excavator inappropriately and charge the same amount to each. The reduction coefficients are set so as to treat favorably those users who use the hydraulic excavator appropriately by reducing the maintenance charge according to the engine operating time.

The third calculating section 15 calculates an amount of refund by subtracting the value of the maintenance charge from the value of the maintenance guarantee. The value of the maintenance guarantee corresponds to the standard amount of money described earlier and is inputted from the standard setting section 11. The value of the maintenance guarantee is a sum of money which the administrator receives from the user upon renting the hydraulic excavator to the user. The refund is to be paid back by the administrator to the user when the user returns the hydraulic excavator to the administrator.

In the foregoing, the differential pressure detector 36 and the controller 4 constitute an amount of deposits acquisition unit that acquires the amount of deposits of the particulate matter deposited in the filter. The processing functions achieved by the standard setting section 11, the first calculating section 12, the memory section 13, the second calculating section 14, and the third calculating section 15 of the server 10 constitute a billing unit that bills the maintenance charge according to the amount of deposits at returning acquired by the amount of deposits acquisition unit.

—Operation—

Operation of the management system for the exhaust purification apparatus having arrangements as described above according to the embodiment of the present invention will be described below.

Turnover of rented hydraulic excavators will first be described. The rental company rents a hydraulic excavator to the user (operator) as a customer. The user uses the hydraulic excavator and, after use, returns the hydraulic excavator to the rental company. The rental company as the administrator services and maintains the hydraulic excavator before renting the same to another customer. As such, the hydraulic excavator goes through a turnover cycle of renting, use, returning, and maintenance, in that order.

The administrator services or maintains the hydraulic excavator before the renting. Accordingly, the hydraulic excavator is rented with no PM whatever deposited in the filter 32. Further, the engine operating time and the number of regeneration sequences are reset to zero. At renting, the administrator explains to the user the importance of manual regeneration, operating procedures, and a billing system and, at the same time, receives the maintenance guarantee from the user. The administrator's receiving the maintenance guarantee from the user upon renting allows the administrator to keep on hand expenses incurred in performing service and maintenance jobs for the hydraulic excavator, so that load of management on the administrator in terms of expenditure can be reduced.

As the user uses the hydraulic excavator, PM is gradually deposited in the filter 32. The deposited PM is burned and removed as appropriately by the automatic regeneration; however, the deposited PM may not be properly removed. In this case, the alarm display that prompts the operator to perform the manual regeneration appears on the display 6. The operator, having noticed the alarm display, operates the regeneration switch 38. This executes the manual regeneration. The controller 4 counts the number of regeneration sequences, in which the regeneration fuel injection device 39 is operated, with the input of the operation signal from the regeneration switch 38, calculates the cumulative number of engine operating time with the input of the ON/OFF signal from the key switch 5, and estimates the amount of PM deposited in the filter 32 with the input of the detection signal from the differential pressure detector 36. The controller 4 then transmits these pieces of information to the server 10 of the administrator company via the radio communication device 7 as appropriately.

Operation associated with billing will be described below using four cases of (1) through (4).

Figure 4A:
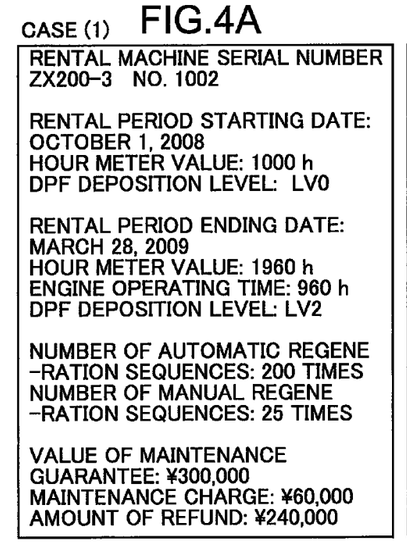
FIGS. 4A to 4D show typical billing screens to be displayed on a monitor connected to a server.

Case (1): FIG. 4A shows a typical billing screen to be displayed on a monitor 10a connected to the server 10. FIG. 4A represents a case in which a rental machine was rented and used appropriately for a rental period of 6 months for operation of 8 hours a day and 20 days per month. The rental machine is "used appropriately", if the operator performs manual regeneration by operating the regeneration switch 38 as prompted by the alarm display.

The deposition level was level 0 and an hour meter read 1000 hours at the time of renting. Upon returning, the deposition level was level 2, the hour meter read 1960 hours, and the engine operating time was 960 hours (8 hours×20 days×6 months). For the rental period, the automatic regeneration was performed 200 times and the manual regeneration by the operator (user) was performed 25 times.

In the server 10, the standard setting section 11 sets the standard amount of deposits (that corresponds to 2.5 g/L, level 5) and the standard amount of money (¥300,000) in advance. The first calculating section 12 calculates the maintenance charge (¥120,000) by multiplying the standard amount of money (¥300,000) by the ratio (2/5) of the deposition level at returning (level 2) to the standard deposition level (level 5). The memory section 13 stores in memory the engine operating time (960 hours) and the number of regeneration sequences performed (25 times). The second calculating section 14 sets a reduction coefficient (0.5) according to the engine operating time and the number of regeneration sequences based on the reduction coefficient table (see FIG. 3), and multiplies the maintenance charge (¥120,000) calculated by the first calculating section 12 by the reduction coefficient (0.5) to thereby find the maintenance charge after reduction (¥160,000). The third calculating section 15 calculates the amount of refund (¥240,000) by subtracting the value of the maintenance charge (¥60,000) from the value of the maintenance guarantee (¥300,000). The value of the maintenance guarantee (¥300,000), the value of the maintenance charge (¥60,000), and the amount of refund (¥240,000) appear on the monitor 10a of the server 10.

This allows the administrator to keep on hand expenses (¥60,000) to be incurred in performing service and maintenance jobs according to the amount of deposits upon returning, so that load of management on the administrator in terms of expenditure can be reduced. As a result of efforts made by the user to use the rental machine appropriately in order to reduce the maintenance charge to be billed, the amount of PM deposits at returning is smaller than case (4) (comparative example) to be described later (level 4→level 2).

After the hydraulic excavator is returned, the rental company as the administrator services and maintains the hydraulic excavator before renting the same to another customer. Because the amount of PM deposited in the filter is small at returning, the load of management in terms of work and time can be reduced.

The user receives a large amount of refund (¥60,000→¥240,000), way more as compared with case (4) (comparative example) to be described later. This makes the user aware of the importance of the manual regeneration, so that the user makes more and more efforts to use the rental machine even more appropriately.

Figure 4B:
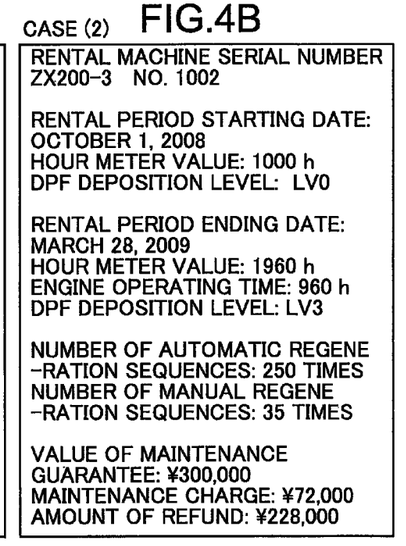

Case (2): FIG. 4B is a billing screen that represents a case in which a rental machine was rented and used appropriately for a rental period of 6 months for operation of 8 hours a day and 20 days per month. Upon returning, the deposition level was level 3 and the engine operating time was 960 hours (8 hours×20 days×6 months). For the rental period, the automatic regeneration was performed 250 times and the manual regeneration by the operator was performed 35 times.

In the server 10, the standard setting section 11 sets the standard amount of deposits and the standard amount of money (¥300,000). The first calculating section 12 calculates the maintenance charge (¥180,000) by multiplying the standard amount of money (¥300,000) by the ratio (3/5) of the deposition level at returning (level 3) to the standard deposition level (level 5). The memory section 13 stores in memory the engine operating time (960 hours) and the number of regeneration sequences performed (35 times). The second calculating section 14 sets a reduction coefficient (0.4) according to the engine operating time and the number of regeneration sequences based on the reduction coefficient table (see FIG. 3) and multiplies the maintenance charge (¥180,000) calculated by the first calculating section 12 by the reduction coefficient (0.4) to thereby find the maintenance charge after reduction (¥72,000). The third calculating section 15 calculates the amount of refund (¥228,000) by subtracting the value of the maintenance charge (¥72,000) subtracted from the value of the maintenance guarantee (¥300,000). The value of the maintenance guarantee (¥300,000), the value of the maintenance charge (¥72,000), and the amount of refund (¥228,000) appear on the monitor 10a of the server 10.

In cold areas or depending on the use conditions, PM may be deposited despite an appropriate use of the rental machine by performing the manual regeneration as prompted by the alarm display. In case (2), as compared with case (1), the deposition level increases to level 3 over level 2 of case (1), despite the same engine operating time as in case (1). This is attributable to differences in the use conditions, such as the use in cold areas, and the operator increases the number of manual regeneration sequences (from 25 times to 35 times) as the number of automatic regeneration sequences increases (from 200 times to 250 times). Specifically, the operator seems to have made sure of appropriate use. The maintenance charge is reduced according to the number of regeneration sequences performed, thereby treating favorably the user who attempts to make sure of appropriate use. In case (2), though the deposition level increases as compared with that of case (1), the maintenance charge (¥60,000 against ¥72,000) and the amount of refund (¥240,000 against ¥228,000) remain substantially the same. This indicates that the user is favorably treated by inhibiting an excessive increase in load on the part of the user.

Such being the case, the user is aware of the importance of the manual regeneration at all times regardless of the use conditions and tries harder to use the rental machine appropriately. As a result, PM deposition can be inhibited as much as possible under any use conditions not suitable for regeneration, so that the load of management can be reduced.

Figure 4C:
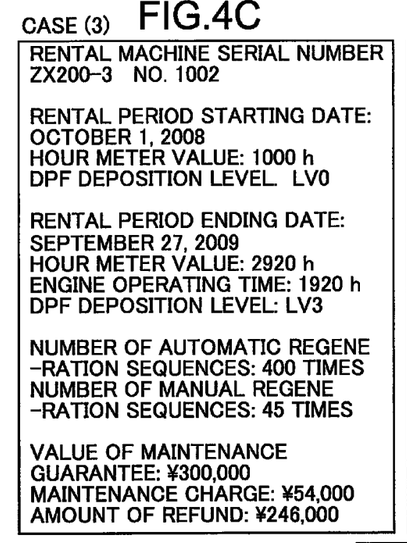

Case (3): FIG. 4C is a billing screen that represents a case in which a rental machine was rented and used appropriately for a rental period of 12 months for operation of 8 hours a day and 20 days per month. Upon returning, the deposition level was level 3 and the engine operating time was 1920 hours (8 hours×20 days×12 months). For the rental period, the automatic regeneration was performed 400 times and the manual regeneration by the operator was performed 45 times.

In the server 10, the standard setting section 11 sets the standard amount of deposits and the standard amount of money (¥300,000). The first calculating section 12 calculates the maintenance charge (¥180,000) by multiplying the standard amount of money (¥300,000) by the ratio (3/5) of the deposition level at returning (level 3) to the standard deposition level (level 5). The memory section 13 stores in memory the engine operating time (1920 hours) and the number of regeneration sequences performed (45 times). The second calculating section 14 sets a reduction coefficient (0.3) according to the engine operating time and the number of regeneration sequences based on the reduction coefficient table (see FIG. 3), and multiplies the maintenance charge (¥180,000) calculated by the first calculating section 12 by the reduction coefficient (0.3) to thereby find the maintenance charge after reduction (¥54,000). The third calculating section 15 calculates the amount of refund (¥246,000) by subtracting the value of the maintenance charge (¥54,000) from the value of the maintenance guarantee (¥300,000). The value of the maintenance guarantee (¥300,000), the value of the maintenance charge (¥54,000), and the amount of refund (¥246,000) appear on the monitor 10a of the server 10.

PM may be inevitably deposited if the engine is run for a long time even if the rental machine is used appropriately. In case (3), the engine operating time doubles that in case (1) and the deposition level increases from level 2 to level 3. It can nonetheless be considered that an appropriate use of the rental machine inhibits the increase in the deposition level as much as possible. The maintenance charge is reduced according to the engine operating time, thereby treating favorably the user who attempts to make sure of appropriate use. In case (3), though the deposition level increases as compared with that of case (1), the maintenance charge (¥60,000 against ¥54,000) and the amount of refund (¥240,000 against ¥246,000) remain substantially the same.

Such being the case, the user is continuously aware of the importance of the manual regeneration even if the rental machine is used for a long time and tries harder to use the rental machine appropriately. As a result, PM deposition can be inhibited as much as possible even under the condition of machine use over a long time, so that the load of management can be reduced.

Figure 4D:
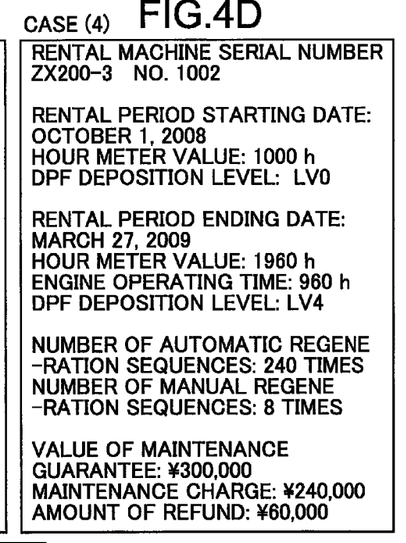

Case (4) (comparative example): FIG. 4D is a billing screen that represents a case in which a rental machine was rented and used inappropriately for a rental period of 6 months for operation of 8 hours a day and 20 days per month. Upon returning, the deposition level was level 4 and the engine operating time was 960 hours (8 hours×20 days×6 months). For the rental period, the automatic regeneration was performed 240 times and the manual regeneration by the operator was performed 8 times.

In the server 10, the standard setting section 11 sets the standard amount of deposits and the standard amount of money (¥300,000). The first calculating section 12 calculates the maintenance charge (¥240,000) by multiplying the standard amount of money (¥300,000) by the ratio (4/5) of the deposition level at returning (level 4) to the standard deposition level (level 5). The memory section 13 stores in memory the engine operating time (960 hours) and the number of regeneration sequences performed (8 times). The second calculating section 14 sets a reduction coefficient (1.0) according to the engine operating time and the number of regeneration sequences based on the reduction coefficient table (see FIG. 3) and multiplies the maintenance charge (¥240,000) calculated by the first calculating section 12 by the reduction coefficient (1.0) to thereby arrive at the maintenance charge without reduction (¥240,000). The third calculating section 15 calculates the amount of refund (¥60,000) by subtracting the value of the maintenance charge (¥240,000) from the value of the maintenance guarantee (¥300,000). The value of the maintenance guarantee (¥300,000), the value of the maintenance charge (¥240,000), and the amount of refund (¥60,000) appear on the monitor 10a of the server 10.

In case (4) (comparative example), as compared with case (1), the deposition level increases from level 2 to level 4, despite the same engine operating time as in case (1). This is considered to be attributable to an inappropriate use by the operator. Specifically, the operator performed the manual regeneration only 8 times. This resulted in an increased deposition level, so that the number of automatic regeneration sequences performed increased (from 200 times to 240 times). As is known from the foregoing, if the deposition level increases because of an inappropriate use, an even larger amount of maintenance charge (¥60,000→¥240,000) is billed.

—Effects—

The arrangements of the embodiment of the present invention achieve the following effects.

By billing the maintenance charge according to the amount of deposits at returning, the administrator can keep on hand expenses to be incurred in performing service and maintenance jobs according to the amount of deposits at returning, so that load of management on the administrator in terms of expenditure can be reduced. On the other hand, the user tries to reduce the amount of PM deposits with the aim of reducing the maintenance charge to be billed, which results in a smaller amount of PM deposits at returning. Load of management on the administrator in terms of work and time can thus be reduced.

PM may be inevitably deposited even if the rental machine is used appropriately. In such cases, too, the user who tries to ensure appropriate use is favorably treated, which encourages the user to be aware of the importance of the manual regeneration and to try even harder to ensure the appropriate use. As a result, PM deposition can be inhibited as much as possible and the load of management on the administrator can be reduced.

The diesel engine 1 is brought to a stop when the amount of PM deposits exceeds the standard amount of deposits. This prevents the exhaust purification apparatus 30 from being damaged.

The user's trying to ensure the appropriate use prevents the exhaust purification apparatus 30 from being damaged. This promotes an extended service life of the exhaust purification apparatus 30.

Modified Examples

While the present invention has been particularly shown and described with reference to a preferred embodiment, it will be understood by those skilled in the art that it is not intended to limit the invention to the precise form disclosed. Various changes may be made therein without departing from the spirit and scope of the invention. Following are some modified examples.

1. In the embodiment of the present invention described above, the billing screen showing information including the deposition level, the value of the maintenance guarantee, the value of the maintenance charge, and the amount of refund is disposed only on the monitor 10a of the server 10. Preferably, the information may additionally be displayed on the display 6 disposed in the cab of the hydraulic excavator.

In this case, the information displayed on the billing screen of the server 10 of the rental company is transmitted to the controller 4 via the radio communication device 7. The controller 4 displays the billing screen on the display 6. Even more preferably, the billing screen is displayed intermittently from time to time, in addition to at the time of returning.

By checking intermittently from time to time the billing screen, the operator (user) can recognize that he or she is favorably treated through the appropriate use of the rental machine and the maintenance charge is reduced accordingly. This helps make the operator aware from time to time the importance of the manual regeneration and try harder to ensure the appropriate use. PM deposition can thereby be inhibited as much as possible, so that the load of management can be reduced.

2. In the embodiment of the present invention described above, the server 10 of the rental company includes the processing functions that are achieved by the standard setting section 11, the first calculating section 12, the memory section 13, the second calculating section 14, and the third calculating section 15 that constitute the billing unit. The processing functions may instead be included in the controller 4 of the hydraulic excavator.

In this case, the controller 4 displays the billing screen on the display 6. Preferably, at this time, the billing screen is displayed intermittently from time to time, in addition to at the time of returning. The information shown on the billing screen displayed on the display 6 is transmitted to the server 10 of the rental company via the radio communication device 7 and displayed also on the monitor 10a. The same effect achieved by the first modified example can thereby be achieved.

What is claimed is:

1. A management system for an exhaust purification apparatus, the exhaust purification apparatus comprising: a filter disposed in an engine exhaust system for trapping particulate matter contained in exhaust gases; a regenerating device for regenerating the filter by burning to remove the particulate matter deposited in the filter; and operating means for operating the regenerating device, the exhaust purification apparatus being mounted in a vehicle that is to be rented to a user by an administrator and later returned to the administrator by the user, the system comprising:

amount of deposits acquisition means for acquiring an amount of deposits of the particulate matter deposited in the filter; and billing means for billing a maintenance charge according to the amount of deposits at returning acquired by the amount of deposits acquisition means, wherein the billing means includes:

a first calculating section for calculating the maintenance charge according to the amount of deposits at returning acquired by the amount of deposits acquisition means, a memory section for storing an engine operating time for a period of time that begins with renting and ends with returning, the number of regeneration sequences performed by the regenerating device as invoked by the operating means and a reduction coefficient table that establishes reduction coefficients according to the engine operating time and the number of regeneration sequences performed, and a second calculating section for determining the reduction coefficient based on the reduction coefficient table stored in the memory section and according to the engine operating time and the number of regeneration sequences performed stored in the memory section such that the reduction coefficient increases as the engine operating time increases while the reduction coefficient decreases as the number of regeneration sequences performed increases, and then reducing the maintenance charge calculated by the first calculating section based on the reduction coefficient.

2. The system according to claim 1, wherein
the billing means further includes:
a standard setting section for setting in advance a standard amount of deposits and a standard amount of money of the maintenance charge corresponding to the standard amount of deposits;
said first calculating section calculates the maintenance charge using a ratio of a value that represents the amount of deposits at returning to a value that represents the standard amount of deposits.

3. The system according to claim 2,
wherein the standard amount of deposits is a limit amount that results in a damaged exhaust purification apparatus when an amount of the particulate matter that exceeds the standard amount of deposits is deposited in the filter.

4. The system according to claim 2,
wherein the standard amount of deposits is a permissible upper limit amount that is less than the limit amount that results in a damaged exhaust purification apparatus.

5. The system according to claim 2,
wherein the standard amount of money is a value of a maintenance guarantee received from the user upon renting, and
the billing means includes a third calculating section for calculating an amount of refund by subtracting a value of the maintenance charge from the value of the maintenance guarantee.

* * * * *